Aug. 2, 1955

C. J. VAN EYK 2,714,693

ELECTRIC SERVO CONTROL CIRCUIT

Filed Aug. 4, 1953

INVENTOR.
Christiaan J. Van Eyk
BY
Norman T. Holland
his ATTORNEY

United States Patent Office 2,714,693
Patented Aug. 2, 1955

2,714,693
ELECTRIC SERVO CONTROL CIRCUIT
Christiaan J. Van Eyk, Byram, Conn.

Application August 4, 1953, Serial No. 372,256

6 Claims. (Cl. 317—137)

The present invention relates to an electric control circuit which translates a control signal such as an aircraft auto-pilot error signal to a motor control signal for operation of a motor control relay by pulse modulated D. C. signals. The motor control relay governs the operation of an electric motor such as an aircraft control surface trim tab adjust motor, a pulsed fuel injector valve relay or motor, or other similar devices.

The circuit represents an advance upon known types of control circuits in that it provides a relatively simple circuit using standard control tubes and light weight A. C. relays. An inexpensive circuit is provided in which tube replacement and maintenance are simple and in which the control relays may be placed directly in an alternating current plate circuit.

The purpose of the invention is to provide a reliable, lightweight, electric constant amplitude control circuit.

Another purpose of the invention is the provision of a servo control circuit using standard tubes in place of selected tubes with specially selected characteristics.

Another purpose of the invention is the provision of an electric servo control circuit which is simple, reliable, and light weight.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein.

Figure 1:
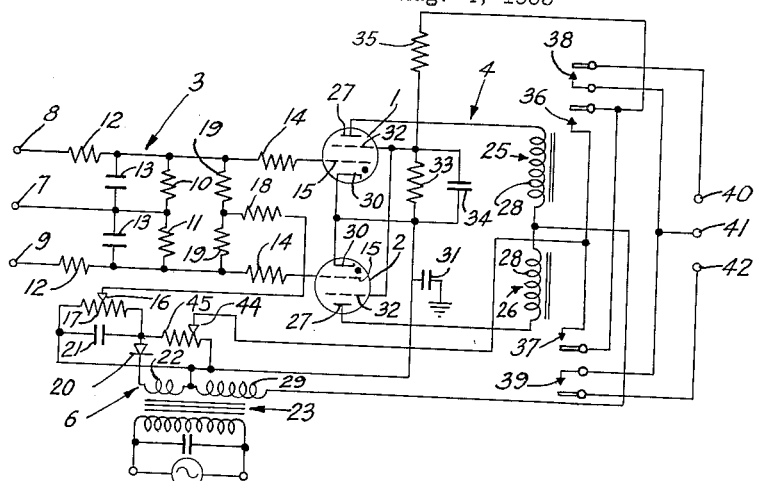
Fig. 1 is a schematic diagram of the control system circuit.

Fig. 1 shows the control circuit in which two thyratron tubes 1 and 2 have an input circuit 3 and an output circuit 4 including A. C. control relays 25 and 26 and a power supply circuit 6.

The input circuit has a common terminal 7 and two signal terminals 8 and 9 to handle input error signals as will be explained below. An input filter circuit consisting of condensers 13 and resistors 10, 11 and 12 is connected between grid resistors 14 and terminals 8 and 9.

Grid resistors 14 are coupled to thyratron control grid 15. An adjustable negative D. C. bias is placed on grid 15 from the tap 16 on resistor 17 through resistor 18 and grid resistor 19. Resistor 17 is connected in parallel with an electrolytic capacitor 21 and the series combination of transformer secondary 22 of transformer 23 and selenium rectifier 20. The input to transformer 23 may be any convenient A. C. source such as the 400 cycle 115 volt supply available in most aircraft.

Plates 27 of thyratrons 1 and 2 are connected to cathodes 30 through A. C. relay coils 28 of relays 25 and 26 and secondary 29 of transformer 23. The cathodes 30 of tubes 1 and 2 are also connected to ground through a condenser 31.

Shield grids 32 of tubes 1 and 2 are coupled together and are coupled to one end of a parallel combination of resistor 33 and electrolytic capacitor 34. The shield grids 32 are also connected to a source of D. C. voltage through resistor 35 and relay contacts 36 and 37 when the relays 25 and 26 are energized. The D. C. is picked off from tap 44 on resistor 45 which is in parallel with resistor 17.

Relays 25 and 26 may be used to switch the control motors directly by contacts 38 and 39 or these contacts may be used to operate additional relays adjacent the control motors.

In order to allow the use of a standard gas tetrode tube, the control grid input impedance and the shield grid impedance are designed with relatively low values. Thus, input resistors 14 are made of the order of 100,000 ohms. Resistor 33 in the shield grid circuit has a value of the order of several thousand ohms and capacitor 34 in the same circuit has a high value. A value of the order of 30 microfarads has been successfully used with a 2D21 thyratron.

Operation

The operation of the circuit will be described with relation to the correction of aircraft control surface trim tabs where an error signal from an auto pilot is converted and used to control trim tab motors. Fig. 1 shows such a control circuit. The invention is not limited to this use since it may be employed in many other similar control circuits.

The error signal output from the auto pilot is in the form of a steady or a pulsating D. C. voltage applied to input circuit 3. The input circuit 3 will handle several different auto pilot error signals inputs. Thus, the input may be applied between terminals 7 and 8 and its polarity reversed to change the direction of trim tab correction. When a signal is thus applied between terminals 7 and 8 resistors 19 and 11 act as a voltage divider. Cathodes 30 are connected to approximately the center of the voltage divider thru resistors 17 and 18. Grids 15 are connected one on either side so that one will be at a higher voltage and one at a lower voltage than cathodes 30. If terminal 8 is negative with respect to terminal 7, the grid 15 of tube 1 will be negative and the grid 15 of tube 2 will be positive with respect to cathodes 30. Tube 1 will remain cut off and tube 2 will fire operating relay 26. If the polarity is reversed tube 1 will fire and tube 2 will remain cut off.

An error signal may also be applied between terminals 7 and 9 in a similar fashion.

The error signal may also be applied between terminals 8 and 9. A similar voltage divider action by resistors 12 and 19 will cause either tube 1 or tube 2 to fire depending upon the polarity of the input signal.

The circuit will be explained with reference to an error signal applied between terminals 7 and 9 to ultimately operate relay 25 to cause a trim tab correction in one direction. It can be seen that a similar explanation applies to a signal applied between terminals 7 and 8.

A D. C. error signal, negative with respect to common terminal 7 is applied between terminals 7 and 9. It is filtered by filter elements 10, 11, 12 and 13 and appears across resistors 19 through resistor 12 from terminal 9 and the resistor 10. Since the cathodes 30 of both tubes are connected to the common connection of resistors 19 through resistors 18 and 17, the resulting voltage across both resistors 19 is divided so as to apply a voltage of positive polarity through resistor 14 to grid 15 of thyratron 1 and a voltage of negative polarity through resistor 14 to grid 15 of thyratron 2. A negative grid bias is applied to grid 15 from the power supply 6 as described above. An A. C. plate voltage is applied to thyratron plate 27 from power supply 6. The D. C. bias voltage on grid 15 is adjusted by tap 16 to keep thyratron 1 cut off when there is no input signal. The position of tap 16 which is called a null control may be set to prevent either tube from firing for input voltages below a given value. The circuit is thus inoperative for low inputs such as caused by noise or insignificant error voltages. The positive error signal on grid 15 of tube 1 causes the thyratron to conduct and the resulting plate current flowing through relay coil 28 operates the relay 25 closing contacts 36 and 38.

Contact 38 connects terminals 40 and 41 to energize the trim tab motor directly or to operate a remotely located relay which in turn operates the trim tab motor.

Contact 36 of relay 25 applies a negative D. C. voltage through resistor 35 to condenser 34 which will immediately begin to charge and in turn apply a negative voltage to shield grid 32. Condenser 34 will continue to charge at a rate determined by resistor 35 and condenser 34 as long as relay 25 remains energized and until the total accumulated voltage across condenser 34 reaches a negative value that will be of sufficient amplitude to prevent the voltage existing on grid 15 from further causing thyratron 1 to conduct. Relay 25, then, is no longer energized and contacts 36 and 38 open cutting off the trim tab motors and removing the charging voltage from condenser 34. Condenser 34 will discharge through resistor 33 at a rate determined by the resistor 33 and condenser 34. As a result, the voltage applied to shield grid 32 will become less negative until a point is reached where the existing voltage on grid 15 will again cause the thyratron to conduct, and the circuit to repeat the process just described. It is characteristic of gas filled tubes such as thyratrons that a more positive grid voltage with relation to the shield grid is required to fire them than to maintain conduction. We will call this difference the firing voltage differential. Thus, once the thyratron 1 has been cut off by the rise of the negative voltage on the shield grid 32, it will remain off until the negative voltage on the shield grid has dropped several volts by the discharge of condenser 34 through resistor 33.

As the amplitude of the error signal impressed on grid 15 is increased, the ratio of the "on" pulse of the trim tab motor control relay increases proportionately to the "off" interval between the "on" pulses. This may be seen in Figure 2. The exponential curve A represents the negative voltage increase on the shield grid 32 after relay 25 has been closed by an error signal being applied to grid 15. The amount of negative voltage required to cause grid 32 to prevent the tube from conducting will depend on the amplitude of the error signal on grid 15. The ratio of the "on" time to the "off" will depend on the portion of the curve that the shield grid must operate. Assume an error voltage on grid 15 which requires a voltage on grid 32 at the level of B to stop the tube from conduction. During the charging time, the relay 25 is closed and voltage is applied to the trim tab motors. When the voltage reaches B, the relay opens, removes the voltage from the motors and the condenser 34 discharges through resistor 33. The voltage on shield grid 32 will become less negative as the condenser discharges until it reaches level C whereupon the error voltage will again cause the tube to conduct closing the relay and repeating this cycle. The voltage difference D between levels B and C is the firing voltage differential, as explained before. The condenser charges towards a comparatively high voltage $B_3$ as applied through contact 36 of relay 25. The time required to reach the voltage as represented by level B is very short since the initial condenser charge is on the very steep part of curve A. The discharge will require more time as the maximum voltage across the condenser now is equal to the voltage of the original charge B and the exponential discharge curve is flattened accordingly. Since the charging time is equal to the "on" time and the discharge time is equal to the "off" time, voltage is applied to the trim tab motors for only short pulses H with long intervals between pulses.

Figure 2:
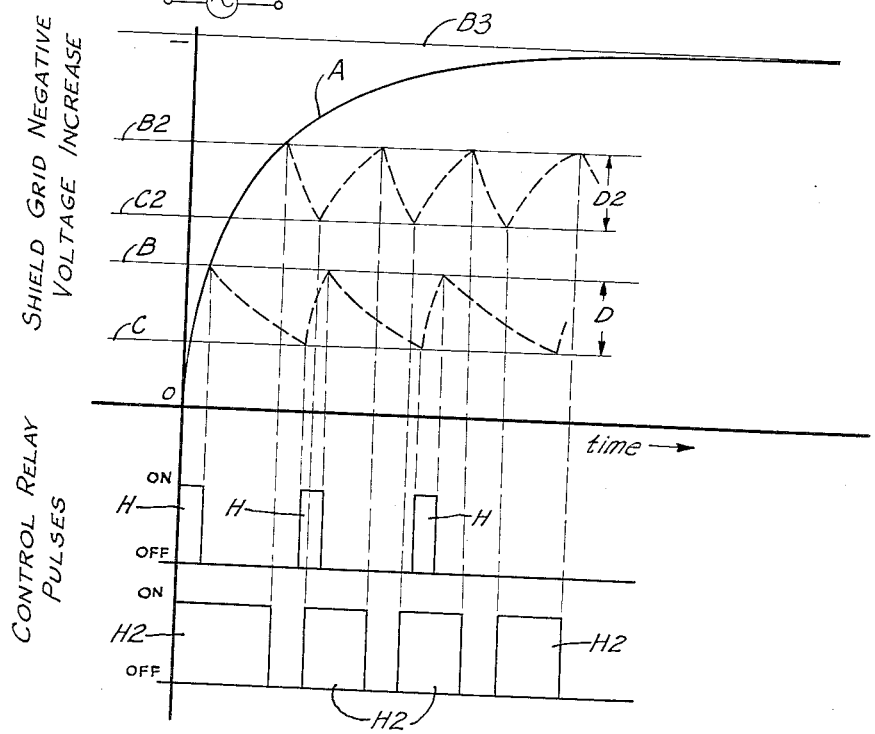
Fig. 2 is a graphical representation showing the relations between the tube shield grid voltage and the control relay operating cycles.

As higher values of error voltage are applied to grid 15, the output pulses become longer in time duration and the intervals between pulses become shorter. Assume an error voltage requiring a voltage on the shield grid 32 at level $B_2$ to stop the tube from conducting. The difference between $B_2$ and $C_2$ is the firing voltage differential $D_2$. As shown in Figure 2, the charging time will be considerably longer since the condenser is operating on a flatter portion of curve A and the discharge time will be shorter since the voltage across the condenser is greater. Consequently, the voltage will be applied to the trim tab motors for a greater length of time than before giving pulses $H_2$ and the intervals will be shorter. When an error signal is applied to grid 15 of such high voltage that a shield grid voltage $B_3$ will not cut the tube off, relay 25 will remain closed and the trim tab motors will run continuously until the error signal is reduced enough to allow screen grid 32 to take control.

The negative voltage applied to condenser 34 may be adjusted by tap 44 or resistor 45. This adjustment may be termed a slope control or pulse duration control since it varies the rate of charge of the condenser 34, and when the voltage is increased, the on pulses become shorter for a given input signal. The time between pulses remains the same since it depends upon the amount of voltage charge on condenser 34 and not the rate of charge. The slope control thus may be used to adjust the speed of correction.

An electrical control circuit is thus provided which translates an error or other control signal into a motor relay control signal. The input whose amplitude is proportional to a given error is converted to a D. C. pulse modulated output whose pulse width is proportional to the error.

As various changes may be made in the form, construction, and arrangement of the parts herein without departing from the spirit and scope of the invention and without sacrificing any of its advantages it is to be understood that all matter therein is to be interpreted as illustrative and not limiting in any sense.

Having thus described my invention I claim:

1. In an electrical control system the combination of a gaseous electric discharge device having at least a plate, a shield grid, a control grid and a cathode, an input circuit connected between said control grid and said cathode, an adjustable bias means for applying a predetermined direct current negative voltage to said control grid, means for applying an alternating current potential between said plate and cathode, an alternating current relay having its coil connected in series with said alternating potential, two pairs of normally open contacts operated by the relay coil, one of said pairs of contacts adapted for connection into an external circuit, means for connecting said shield grid to a source of direct current negative voltage through a control resistor and said second pair of relay contacts, a charging condenser connected between said shield grid and said cathode, and a discharge resistor connected across said condenser whereby the period of conductivity of said discharge device when a positive potential signal is applied to the control grid is determined by the capacity of said condenser and the resistance of said control resistor and whereby the period of nonconductivity of the tube caused by the negatively charged shield grid is controlled by the capacity of the condenser and the resistance of the discharge resistor.

2. The system as claimed in claim 1 in which said source of voltage connected to said shield grid through said control resistor and said second pair of relay contacts is selectively adjustable to further control the period of conductivity.

3. The system as claimed in claim 1 in which the impedance of the input circuit coupled between the control grid and cathode and the impedance of the charging condenser and the discharge resistor coupled between the shield grid and the cathode are relatively low with respect to the internal impedance between corresponding elements of the discharge device.

4. In an electrical control system the combination of a plurality of gaseous electric discharge devices, each having at least a plate, a shield grid, a control grid and a cathode, an input circuit comprising a pair of parallel resistors coupled between the two control grids, said cathodes connected together and to one of said resistors intermediate its ends, an input terminal connected to each of the ends of said parallel resistors, a third input terminal connected to the other of said resistors intermediate its ends, a course of direct current potential connected at its negative side to said control grid and at its opposite side to said cathodes, means to apply an alternating current potential between the plate and cathode of each of said discharge devices, a pair of alternating current relays, each having its coil connected in series with one of the plate alternating potential leads, two pairs of normally open contacts on each relay operated by the relay coil, one of each of said pairs of contacts adapted for connection into an external circuit, means for connecting said shield grids to each other and to a source of direct current negative potential through a control resistor and through said second pairs of relay contacts in parallel, a charging condenser connected between said shield grid and said cathode and a discharge resistor connected across said condenser.

5. The system as claimed in claim 4 in which said source of potential connected to said shield grids through said control resistor and said second pairs of relay contacts is selectively adjustable to control the period of conductivity of said electric discharge devices.

6. The system as claimed in claim 4 in which the impedance of the input circuit coupled between the control grids and the cathodes and the impedance of the charging condenser and the discharge resistor coupled between the shield grids and the cathode are relatively low with respect to the internal impedance between corresponding elements of the discharge device whereby said circuit operates with standard discharge devices chosen at random.

References Cited in the file of this patent

UNITED STATES PATENTS

| | | |
|---|---|---|
| 2,409,473 | Callender | Oct. 13, 1946 |
| 2,534,801 | Siltamaki | Dec. 19, 1950 |
| 2,607,907 | Marshall | Aug. 19, 1952 |